United States Patent
Muraguchi et al.

(10) Patent No.: US 10,040,943 B2
(45) Date of Patent: Aug. 7, 2018

(54) METHOD OF PRODUCING SILICA-BASED PARTICLES

(75) Inventors: Ryo Muraguchi, Kitakyushu (JP); Mitsuaki Kumazawa, Kitakyushu (JP); Toshiharu Hirai, Kitakyushu (JP); Masafumi Hirai, Kitakyushu (JP)

(73) Assignee: JGC CATALYSTS AND CHEMICALS LTD., Kawasaki-Shi, Kanagawa (JP)

( * ) Notice: Subject to any disclaimer, the term of this patent is extended or adjusted under 35 U.S.C. 154(b) by 1955 days.

(21) Appl. No.: 11/631,357

(22) PCT Filed: Jul. 8, 2004

(86) PCT No.: PCT/JP2004/009733
§ 371 (c)(1),
(2), (4) Date: Dec. 29, 2006

(87) PCT Pub. No.: WO2006/006207
PCT Pub. Date: Jan. 19, 2006

(65) Prior Publication Data
US 2008/0090070 A1 Apr. 17, 2008

(51) Int. Cl.
*C01B 33/14* (2006.01)
*C09C 1/30* (2006.01)
(Continued)

(52) U.S. Cl.
CPC ............ *C09C 1/3081* (2013.01); *B82Y 30/00* (2013.01); *C01B 13/363* (2013.01);
(Continued)

(58) Field of Classification Search
CPC ....... C01B 33/193; C01B 33/26; C01B 33/18; C01B 33/146; C01B 13/363; C09C 1/28;
(Continued)

(56) References Cited

U.S. PATENT DOCUMENTS 5,382,383 A * 1/1995 Hirai et al. ................ 252/501.1
6,132,773 A * 10/2000 Amiche ........................ 424/490
(Continued)

FOREIGN PATENT DOCUMENTS

JP H06-330606 11/1994
JP H07-013137 1/1995
(Continued)

OTHER PUBLICATIONS

JP 2001-233611, English language translation PTO Aug. 7234; US Patent and Trademark Office, Wash., DC (Sep. 2008), pp. 1-60.*
(Continued)

*Primary Examiner* — Daniel S Metzmaier
(74) *Attorney, Agent, or Firm* — Manabu Kanesaka

(57) ABSTRACT

Hollow silica-based particles having cavities inside the outer shell having a low refractive index. The method of producing the silica-based particles comprises the following steps (a) and (b):

(a) a step in which, when an aqueous silicate solution and/or an acidic silicic acid solution and an aqueous solution of an alkali-soluble inorganic compound are simultaneously added in an alkali aqueous solution to prepare a dispersion liquid of composite oxide particles, an electrolytic salt is added at the molar ratio of a mole number of the electrolytic salt ($M_E$) versus that of $SiO_2$ ($M_S$) [($M_E$)/($M_S$)] in the range from 0.1 to 10, and (b) a step of furthermore adding an electrolytic salt, if necessary, to the dispersion liquid of composite oxide particles and then removing at least a portion of elements constituting the composite oxide other than silicon by adding an acid to prepare a dispersion liquid of silica-based particles.

16 Claims, 1 Drawing Sheet

(51) Int. Cl.

| | |
|---|---|
| *B82Y 30/00* | (2011.01) |
| *C01B 13/36* | (2006.01) |
| *C01B 33/146* | (2006.01) |
| *C09D 7/40* | (2018.01) |
| *C08K 7/26* | (2006.01) |
| *C08K 9/06* | (2006.01) |

(52) U.S. Cl.
CPC ............ *C01B 33/146* (2013.01); *C09C 1/309* (2013.01); *C09C 1/3045* (2013.01); *C09D 7/67* (2018.01); *C09D 7/68* (2018.01); *C09D 7/70* (2018.01); *C01P 2004/34* (2013.01); *C01P 2004/62* (2013.01); *C01P 2004/64* (2013.01); *C08K 7/26* (2013.01); *C08K 9/06* (2013.01); *Y10T 428/26* (2015.01); *Y10T 428/2984* (2015.01)

(58) Field of Classification Search
CPC ......... C09C 1/3081; C09C 1/30; C09C 1/309; C09C 1/3045; C09D 201/10; C09D 7/12; C09D 7/68; C09D 7/67; C09D 7/61; C09D 7/70; C08K 3/36; C08K 7/26; C08K 9/06; C01P 2004/64; C01P 2004/62; C01P 2004/34; Y10T 428/26; Y10T 428/2984; Y10T 428/31935; Y10T 428/2995
USPC ..................................... 516/79, 80
See application file for complete search history.

(56) References Cited

U.S. PATENT DOCUMENTS

| | | | | |
|---|---|---|---|---|
| 6,680,040 | B1 * | 1/2004 | Nishida ................ | C03C 17/007 423/335 |
| 7,323,122 | B2 * | 1/2008 | Muraguchi et al. ....... | 252/521.3 |
| 2003/0157317 | A1 * | 8/2003 | Ito et al. ........................ | 428/323 |
| 2007/0275257 | A1 * | 11/2007 | Muraguchi et al. ........... | 428/522 |
| 2008/0090070 | A1 * | 4/2008 | Muraguchi et al. ........... | 428/332 |
| 2015/0147469 | A1 * | 5/2015 | Muraguchi ............. | C01B 33/18 427/220 |

FOREIGN PATENT DOCUMENTS

| | | |
|---|---|---|
| JP | H07-133105 | 5/1995 |
| JP | H11-029318 | 2/1999 |
| JP | 2001233611 A * | 8/2001 |
| JP | 2003-026417 A1 * | 1/2003 |
| JP | 2003026417 A * | 1/2003 |
| JP | 2004203683 A * | 7/2004 |
| WO | WO 97/40105 | 10/1997 |
| WO | WO 01/98222 A1 * | 12/2001 |

OTHER PUBLICATIONS

Ralph K. Iler, "The Chemistry of Silica", John Wiley & Sons, NY, NY (copyright 1979), pp. 233-234.*
JPO on EAST, Patent Abstracts of Japan, Japan patent Office, JP02003026417A (Jan. 2003), pp. 1-2.*
Derwent Abstract on EAST, week 200770, London: Derwent Publications Ltd., AN 2003-451771, Class A60, JP 2003026417 A, (Shokubai Kasei Kogyo KK[Nish]), abstract, pp. 1-4.*
Machine translation (JPO) corresponding JP 2003-026417 (Jan. 2003), Catalysts & Chem Ind Co Ltd, obtained online @ http://www19.ipdl.inpit.go.jp/PA1/cgi-bin/PA1INDEX, (downloaded May 24, 2010), pp. 1-12.*
Derwent Abstract on EAST, week 200770, London: Derwent Publications Ltd., AN 2003-451771, Class A60, JP 2003-026417 A, (Catalysts & Chem Ind Co Ltd), abstract.*
JPO on EAST, Patent Abstracts of Japan, Japan patent Office, Tokyo, Japan, JP 2003026417 A (Jan. 2003), Abstract.*
Electrolyte; Sodium Aluminate, Hawley's Condensed Chemical Dictionary, pp. 494 and 1135, © 2007 by John Wiley & Sons, Inc. (Publ. Online Mar. 15, 2007), online @ http://onlinelibrary.wiley.com/book/10.1002/9780470114735/titles.*
Machine Translation of Publ. No. JP 2004-203683, published Jul. 2004, Japan patent Office, Tokyo, Japan, obtained online @ http://dossier1.ipdl.inpit.go.jp/AIPN/odse_top_dn.ipdl?N0000=7400 (Downloaded Dec. 22, 2014), pp. 1-18.*
Hartshorn et al.,Nomenclature of Inorganic Chemistry, "2.8 Inorganic oxoacids and related compounds," in CRC Handbook of Chemistry and Physics, 98th Edition (Internet Version 2018), John R. Rumble, ed., CRC Press/Taylor & Francis, Boca Raton, FL. online @ http://hbcponline.com/faces/documents/02_12/02_12_0001.xhtml.*

* cited by examiner

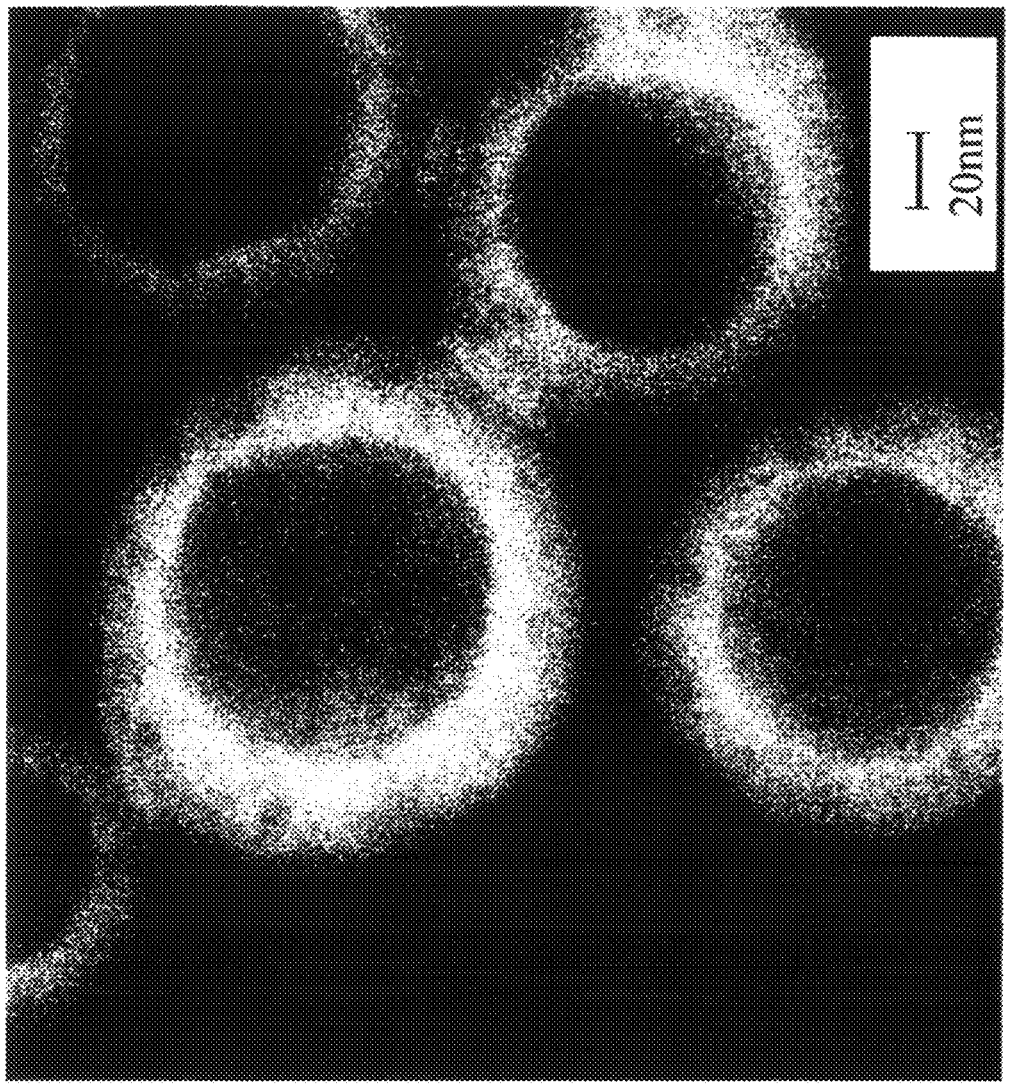

METHOD OF PRODUCING SILICA-BASED PARTICLES

TECHNICAL FIELD

The present invention relates to a method of producing silica-based particles having inside cavities.

BACKGROUND ART

Hollow silica particles having a particle diameter in the range from 0.1 to about 300 µm are known (Refer to, for example, Patent document 1, and Patent document 2). Also there is known a method of producing hollow particles each having a tight silica shell by depositing active silica from an aqueous solution of an alkali metal silicate on a core made of a material other than silica, and removing the material without breaking the silica shell (Refer to, for example, Patent document 3).

Furthermore, there are known spherical silica particles with the size at the level of micron having a core shell structure comprising a shell in the outer peripheral portion and a hollow central portion. The shell has a concentration gradient tighter toward the outer side and rougher toward the inner side (Refer to, for example, Patent document 4).

The present applicant already proposed to produce composite oxide particles with the size at the nanometer level and also having a low refractive index by completely covering surfaces of porous inorganic oxide particles with such a material as silica (Refer to Patent Document 5), and furthermore proposed to produce hollow silica-based particles with the size at the nanometer level and also having a low refractive index by forming a silica coating layer on a particle of composite oxide including silica and an inorganic oxide other than silica, then removing the inorganic oxide other than silica, and covering the particles with silica, if necessary (Refer to Patent document 6).

However, with the particles proposed by the applicant, sometimes a sufficiently low refractive index can not be obtained in practical use of the particles in some applications. Furthermore, in the method of producing the particles described in Patent document 6, the process is rather complicated because of, for instance, the necessity of forming a silica coating layer prior to removal of the inorganic oxide other than silica, and there are some problems in the reproducibility and productivity.

Furthermore, in the conventional types of particles as described above, stability of paint for forming a coating film used in production of a coated substrate is not sufficient, and a coating film obtained by using the paint for forming a coating film is sometimes not uniform in the thickness and not sufficient in the film strength.

Patent document 1: JP 06330606 A
Patent document 2: JP 07013137 A
Patent document 3: JP 2000500113 A
Patent document 4: JP 11029318 A
Patent document 5: JP 07133105 A
Patent document 6: JP 2001233611 A

DISCLOSURE OF INVENTION

Problems to be Solved by the Invention

The present invention is based on the invention disclosed in Patent document 6, and an object of the present invention is to provide silica-based particles having a low refractive index. Another object of the present invention is to provide a method of producing hollow silica-based particles having cavities inside the outer shell by growing porous particles (primary particles) of composite oxide in the presence of an electrolytic salt and then removing the inorganic oxide other than silica in the presence of the electrolytic salt.

Another object of the present invention is to provide paint for forming a coating film which contains the hollow and spherical silica-based particles and a matrix for forming a coating film and are excellent in the stability and capability in forming a coating film.

Another object of the present invention is to provide a coated substrate having a low refractive index and excellent in such performances as adhesiveness, strength, and reflection-preventing capability.

Means for Solving the Problems

The method of producing silica-based particles according to the present invention comprises the following steps (a) and (b):

(a) a step in which, when an aqueous silicate solution and/or an acidic silicic acid solution and an aqueous solution of an alkali-soluble inorganic compound are simultaneously added in an alkali aqueous solution or in an alkali aqueous solution with seed particles dispersed therein, if required, to prepare a dispersion liquid of composite oxide particles with a molar ratio of $MO_x/SiO_2$ in the range from 0.3 to 1.0, the $MO_x$ denoting an inorganic oxide other than silica, and $SiO_2$ denoting silica, an electrolytic salt is added at the molar ratio of a mole number of the electrolytic salt ($M_E$) versus that of $SiO_2$ ($M_S$) [$(M_E)/(M_S)$] in the range from 0.1 to 10 at a point of time when the average particle diameter of the composite oxide particles is in the range from 5 to 50 nm, and (b) a step of furthermore adding an electrolytic salt, if necessary, to the dispersion liquid of composite oxide particles and then removing at least a portion of elements constituting the composite oxide other than silicon by adding an acid to prepare a dispersion liquid of silica-based particles.

The dispersion liquid of the silica-based particles obtained in the step (b) is preferably subjected to the following step (d).

(d) a step of cleaning the dispersion liquid of silica-based particles, if necessary, and then aging the dispersion liquid at a temperature in the range from the room temperature to 300° C.

Preferably the dispersion liquid of silica-based particles obtained in the step (d) is subjected to the following step (e).
(e) a step of cleaning the dispersion liquid if required and then subjected to the dispersion liquid to the hydrothermal processing at a temperature in the range from 50 to 300° C.

The step (e) is preferably repeated several times.

After the step (b), or between the step (b) and the step (d), preferably the following step (c) is performed.

(c) a step of adding an alkali aqueous solution and an organic silicon compound expressed by the following chemical formula (1) and/or a partially hydrolyzed product thereof in the dispersion liquid of silica-based particles obtained in the step (b) to form a silica coating layer on the particles:

$$R_nSiX_{(4-n)} \tag{1}$$

wherein R denotes any of a not-substituted or substituted hydrocarbon group having 1 to 10 carbon atoms, an acryl group, an epoxy group, a methacryl group, an amino group, or a $CF_2$ group; X denotes an alkoxy group having 1 to 4 carbon atoms, a silanole group, a halogen or hydrogen; and n indicates an integral number in the range from 0 to 3.

pH of the alkali aqueous solution or an alkali aqueous solution with seed particles dispersed therein if necessary is preferably 10 or more.

The inorganic oxide other than silica is preferably alumina.

The dispersion liquid of silica-based particles obtained as described above is preferably cleaned, dried and sintered, if necessary.

An average diameter of the silica-based particles is preferably in the range from 5 to 500 nm.

A content of alkali metal oxide in the silica-based particles or in the dispersion liquid of silica-based particles is preferably 5 ppm or below as expressed by a content of $M_2O$ (M denoting an alkali metal element) in the silica-based particle.

A content of ammonia and/or ammonium ions in the silica-based particles or in the dispersion liquid of silica-based particles as expressed by that of $NH_3$ in silica-based particle is preferably 1500 ppm or below.

The silica-based particles having cavities in an outer shell according to the present invention has an average particle diameter in the range from 5 to 500 nm, and the refractive index is in the range from 1.15 to 1.38. The molar ratio of $MO_x/SiO_2$, the $MO_x$ denoting an inorganic oxide other than silica and $SiO_2$ denoting silica, is in the range from 0.0001 to 0.2, and a content of the alkali metal oxide as expressed by that of $M_2O$ (M denoting an alkali metal element) is 5 ppm or below. The content of the ammonia and/or ammonium ions in the silica-based particles is preferably 1500 ppm or below.

The paint for forming a coating film according to the present invention contains the silica-based particles or those prepared by the method of producing silica-based particles according to the present invention and a matrix for forming a coating film.

The coated substrate according to the present invention is prepared by forming a coating film containing the silica-based particles or those obtained by the method of producing the silica-based particles and the matrix for coating a coating film singly or in combination with other coating film.

Effects of the Invention

In the method according to the present invention, composite oxide particles (primary particles) are grown in the presence of an electrolytic salt, also in the subsequent step for removing particular elements, the composite oxide particles maintain the spherical form and are not broken, so that silica-based particles having a very low refractive index can be obtained through the extremely simple production process.

After particular elements are removed or a silica-coated layer is formed and aged, a hydrothermal processing is performed at a high temperature, a content of such materials as an alkali metal oxide and ammonia is reduced. Therefore the obtained paint for forming a coating film with silica-based particles blended therein is highly stable, and also the obtained coating film is excellent in the strength.

In the paint for forming a coating film according to the present invention, contents of the alkali metal oxide and ammonia in the silica-based particles blended therein or in the dispersion liquid of silica-based particles are low, so that the stability is excellent and the coating film prepared by using the silica-based particles or the silica-based particles dispersion liquid is excellent in the strength.

Furthermore, the substrate with coating film according to the present invention has a low refractive index, and is excellent in various performances including adhesiveness to such material as resin, strength, transparency, and capability of preventing reflection.

BRIEF DESCRIPTION OF DRAWINGS

FIGURE is a picture of the silica-based particles obtained in Example 12 taken with a transmission electron microscope (TEM).

BEST MODE FOR CARRYING OUT THE INVENTION

Preferable embodiments of the present invention are described below.

[Method of Producing Silica-Based Particles]

The method of producing silica-based particles according to the present invention includes the following steps (a) and (b), and these steps are indispensable. In addition to the steps, the following steps (c), (d), and (e) may be included. In other words, the method of producing silica-based particles according to the present invention include the steps (a) and (b); steps (a), (b), and (c); steps (a), (b), and (d); steps (a), (b), (c), and (d); steps (a), (b), (d), and (e); or steps (a), (b), (c), (d), and (e). Each of the steps is described below.

(a): A step in which, when a dispersion liquid of composite oxide particles having a molar ratio $MO_x/SiO_2$, wherein silica is expressed as $SiO_2$ and the inorganic oxide(s) other than silica are expressed as $MO_x$, in the range from 0.3 to 1.0 is prepared by simultaneously adding an aqueous silicate solution and/or an acidic silicic acid solution and an aqueous solution of an alkali-soluble inorganic compound in an alkali aqueous solution or in an alkali aqueous solution with seed particles dispersed therein, if necessary, an electrolytic salt is added so that a ratio of a mole number of the electrolytic salt ($M_E$) and that of $SiO_2$ ($M_S$) [($M_E$)/($M_S$)] is in the range from 0.1 to 10 at the point of time when an average diameter of the composite oxide particles is in the range from 5 to 300 nm.

(b): A step in which furthermore an electrolytic salt is added, if necessary, to the dispersion liquid of composite oxide particles, and then an acid is added for the purpose to remove at least a portion of elements constituting the composite oxide particles other than silicon to prepare a dispersion liquid of silica-based particles.

(c): A step in which a silica-coating layer is formed on silica-based particles by adding an alkali aqueous solution and an organic silicon compound expressed by the following chemical formula (1) and/or a partially hydrolyzed product thereof in the dispersion liquid of silica-based particles obtained in the step (b):

$$R_nSiC_{(4-n)} \qquad (1)$$

wherein R denotes any of a not-substituted or substituted hydrocarbon group having 1 to 10 carbon atoms, an acryl group, an epoxy group, a methacryl group, an amino group, or $CF_2$ group; X denotes an alkoxy group having 1 to 4 carbon atoms, a silanole group, a halogen or hydrogen; and n denotes an integer in the range from 0 to 3.

(d): A step in which cleaning is performed, if necessary, and then the dispersion liquid of silica-based particles is aged at a temperature in the range from the room temperature up to 300° C.

(e): A step in which cleaning is performed according to the necessity and then a hydrothermal processing is performed at a temperature in the range from 50 to 300° C.

Step (a)

As the silicate, it is preferable to use at least one silicate selected from the group consisting of an alkali metal silicate, an ammonium silicate, and a silicate of an organic base. It is possible to enumerate sodium silicate (water glass) or potassium silicate as the alkali metal silicate, a quarternary ammonium salts such as a tetraethyl ammonium salt or amines such as monoethanolamine, diethanolamine, triethanolamine as the organic base group. The ammonium silicate or the silicate of an organic base group also includes an alkaline solution prepared by adding ammonia, a quarternary ammonium hydroxide, or an amine compound in a silicic acid solution.

As the acidic silicic acid solution, it is possible to use a silicic acid solution obtained when the alkali is removed, for example, by processing the alkali silicate aqueous solution with a cation exchange rein. It is especially preferable to use an acidic silicic acid solution with the pH of 2 to 4 and the $SiO_2$ concentration of about 7% by weight or low.

As the inorganic oxide, it is possible to enumerate one or more of $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $WO_3$, and the like. As inorganic composite oxides, $TiO_2$—$Al_2O_3$ and $TiO_2$—$ZrO_2$ can be enumerated.

As raw materials for the inorganic oxides as described above, it is preferable to use an alkali-soluble inorganic compound, and it is possible to enumerate alkali metal salts or alkali-earth salts of an oxoacid metal salt or an oxoacid non-metal salt, ammonium salts, and quarternary ammonium salts constituting the inorganic oxides. More specifically, it is preferable to use sodium aluminate, sodium tetraborate, zirconyl ammonium carbonate, potassium antimonate, potassium stannate, sodium aluminosilicate, sodium molybdate, cerium ammonium nitrate, sodium phosphate and the like.

For preparing the dispersion liquid of composite oxide particles, at first each alkali aqueous solution of the inorganic compounds is prepared separately or a mixture solution is prepared, and then the aqueous solution is gradually added with agitation to an alkali aqueous solution, and preferably in an alkali aqueous solution with the pH of 10 or more according to a target blending ratio of silica versus the inorganic oxide other than silica.

As for the ratio of a raw material for silica versus the inorganic compound each added in the alkali solution, the molar ratio of $MO_x/SiO_2$, $SiO_2$ denoting a content of silica and $MO_x$ denoting that of the inorganic compound other than silica, is preferably in the range from 0.3 to 1.0, and more preferably in the range from 0.35 to 0.85. When the $MO_x/SiO_2$ is less than 0.3, a volume of cavities in the finally obtained silica-based particles is not sufficiently large. On the other hand, when the $MO_x/SiO_2$ is over 1.0, it becomes difficult to obtain spherical composite oxide particles, and as a result, a percentage of the cavity volume in the obtained hollow particles drops.

When the molar ratio $MO_x/SiO_2$ is in the range from 0.3 to 1.0, the composite oxide particles have the structure in which silicon atoms and elements other than silicon are alternately linked to each other via an oxygen atom. Namely, there is often generated a structure in which an oxygen atom is linked to each of the four bonds of a silicon atom, and an element M other than silica is linked to the oxygen atom, and therefore when the element M other than silica is removed in the subsequent step (b), also the silicon atom can be removed together with the element M as a silicate monomer or a silicate oligomer.

In the production method according to the present invention, when a dispersion liquid of the composite oxide particles is prepared, a dispersion liquid of seed particles may be used as a starting material. In this case, any of inorganic oxides such as $SiO_2$, $Al_2O_3$, $TiO_2$, $ZrO_2$, $SnO_2$ and $CeO_2$ or composite oxides of the materials such as, for example, $SiO_2$—$Al_2O_3$, $TiO_2$—$Al_2O_3$, $TiO_2$—$ZrO_2$, $SiO_2$—$TiO_2$, and $SiO_2$—$TiO_2$—$Al_2O_3$ may be used, and generally the material can be used as a sol. The dispersion liquid of the seed particles as described above can be prepared by any known method. For example, the dispersion liquid can be obtained by adding an acid or an alkali in a metal salt corresponding to any of the inorganic oxides, in a mixture of the metal salts, or in a metal alcoxide for hydrolysis and aging the mixture, if required.

The aqueous solution of the compound is added with agitation according to the similar procedure for adding the solution in the alkali aqueous solution, in the alkali aqueous solution with the seed particles dispersed therein, and more preferably in the alkali aqueous solution with the seed particles dispersed therein and with the pH or 10 or more. When the composite oxide particles are grown by using seed particles as described above, control over the particle diameter of the grown particles is easy, and particles having relatively uniform size can be obtained. A ratio of raw materials for silica versus the inorganic compound each added in the dispersion liquid of seed particles is the same employed when adding the materials in the alkali aqueous solution.

The raw material for silica and that for the inorganic material have high solubility in the alkali side. However, when the two materials are mixed with each other in a pH zone of the high solubility, solubility of oxoacid ions such as silicate ion and aluminate ion drops, and the composite products of the materials are segregated and grow to colloidal particles, or are deposited to the seed particles to grown into particles.

When the dispersion liquid of composite oxide particles is prepared, also the organic silicon compound expressed by the chemical formula (1) described below and/or a hydrolyte thereof may be added as a raw material for silica in the alkali aqueous solution.

As the organic silicon compounds, there can be enumerated the following materials: tetramethoxysilane, tetraethoxysilane, tetraisopropoxysilane, methyl trimethoxysilane, dimethyl dimethoxysilane, phenyl trimethoxysilane, diphenyl dimethoxysilane, methyl trimethoxysilane, dimethyl diethoxysilane, phenyl triethoxysilane, diphenyl diethoxysilane, isobutyl trimethoxysilane, vinyl trimethoxysilane, vinyl triethoxysilane, vinyl-tris(β-methoxyethoxy)silane, 3,3,3-trifluoropropyl trimethoxysilane, methyl-3,3,3-trifluoropropyl dimethoxysilane, β-(3,4 epoxycyclohexyl)ethyl trimethoxysilane, γ-glycidoxytripropyl trimethoxysilane, γ-glycidoxypropyl methyl diethoxysilane, γ-glycidoxypropyl triethoxysilane, γ-methacryloxypropyl methyl dimethoxysilane, γ-methacryloxypropyl trimethoxysilane, γ-methacryloxypropyl methyl diethoxysilane, γ-methacryloxypropyl triethoxysilane, N-β(aminoethyl) γ-aminopropyl methyl dimethoxysilane, N-β(aminoethyl) γ-aminopropyl trimethoxysilane, N-β(aminoethyl) γ-aminopropyl triethoxysilane, γ-aminopropyl trimethoxysilane, γ-aminopropyl triethoxysilane, N-phenyl-γ-aminopropyl trimethoxysilane, γ-mercaptopropyl trimethoxysilane, trimethyl silanole, methyl trichlorosilane, methyl dichlorosilane, dimethyl dichlorosilane, trimethyl chlorosilane, phenyl trichlorosilane, diphenyl dichlorosilane, vinyl trichlorosilane, trimethyl bromosilane, and diethylsilane, and the like.

In the organic silicon compound, when n is in the range from 1 to 3, the hydrophilicity is low. Therefore, it is preferable to previously hydrolyze the compound so that the compound can homogeneously be mixed in the reaction system. Any known method may be employed for hydrolyzing the compounds. When a hydroxide of an alkali metal, ammonia water, or a basic compound such as amine is used as a catalyst for hydrolysis, the basic catalyst may be removed after the hydrolysis and the solution may be converted to an acidic solution for use. When a hydrolyzed product is prepared by using an acidic catalyst such as an organic acid or an inorganic acid, the acidic catalyst is preferably removed, for example, by ion exchange. Furthermore it is desirable to use the hydrolyzed product of the organic silicon compound in a form of an aqueous solution. The term of aqueous solution as used herein means the state where the hydrolyzed product is transparent and does not have white turbidity as gel.

In the present invention, in the step (a), the electrolytic salt is added so that a ratio of a mole number of the electrolytic salt ($M_E$) and that of $SiO_2$ ($M_S$)($M_E/M_S$) is in the range from 0.1 to 10, preferably in the range from 0.2 to 8 at the time point when an average particle diameter of the composite oxide particles is substantially in the range from 5 to 300 nm (the composite oxide particles at this time point is sometimes referred to as "primary particles").

As the electrolytic salt, there can be enumerated water-soluble ones such as sodium chloride, potassium chloride, sodium nitrate, potassium nitrate, sodium sulfate, potassium sulfate, ammonium nitrate, ammonium sulfate, magnesium chloride, and magnesium nitrate.

The electrolytic salt may be added all at once at this point of time, or added continuously or intermittently adding an alkali metal silicate or an inorganic compound other than silica to grow composite oxide particles.

Although a quantity of the electrolytic salt to be added changes according to a concentration of the dispersion liquid of the composite oxide particles, when the molar ratio above ($M_E/M_S$) is less than 0.1, the effect obtained by adding the electrolytic salt is insufficient, and the composite oxide particles can not maintain the spherical form and are broken when an acid is added in the step (b) for removing at least a portion of elements other than silicon constituting the composite oxide particles, which makes it difficult to obtain hollow silica-based particles. The effect obtained by adding the electrolytic salt is presumably that silica content becomes higher at a surface of the composite oxide having grown into particles although the reason has not been clarified and the silica not soluble in an acid functions as a protective film for the composite oxide particles.

Even when the molar ratio ($M_E/M_S$) is over 10, the effect obtained by adding the electrolytic salt is not improved, and new fine particles grow, which is economically disadvantageous.

When the electrolytic salt is added, if the average particle diameter of the primary particles is less than 5 nm, new fine particles grow and selective growth of the primary particles does not occur, which sometimes makes distribution of diameters of the composite oxide particles not uniform. When the electrolytic salt is added, if the average diameter of the primary particles is over 300 nm, sometimes a long time is required for removing elements other than silicon in the step (b), or even the process itself becomes difficult. The average diameter of the composite oxide particles is in the range from 5 to 500 nm, which is substantially equal to that of the finally obtained silica-based particles.

Step (b)

In the step (b), hollow and spherical particles having internal cavities are produced by removing a portion or all of elements other than silica constituting the composite oxide particles from the composite oxide particles.

When removing the elements, it is allowable to employ the method in which the electrolytic salt is again added in the dispersion liquid of composite oxide particles according to the necessity so that a ratio of a mole number of the electrolytic salt ($M_E$) and that of $SiO_2$ ($M_S$)($M_E/M_S$) is in the range from 0.1 to 10, preferably in the range from 0.2 to 8, and then a mineral acid or an organic acid is added, or a method in which the dispersion liquid is contacted to cation exchange resin for ion exchange. The methods described above may be employed in combination for removal of the elements.

A concentration of the dispersion liquid of composite oxide particles is preferably in the range from 0.1 to 50% by weight, and more preferably in the range from 0.5 to 25% by weight when calculated as that of the oxide, although the desirable concentration varies according to the processing temperature. When the concentration of the composite oxide particles is less than 0.1% by weight, a quantity of dissolved silica increases, which sometimes makes it difficult for the composite oxide particles to maintain the form, and even when the composite oxide particles can maintain the form, the concentration becomes lower, which lowers the processing efficiency. When the concentration of the composite oxide particles is over 50% by weight, the particles are not dispersed sufficiently, which sometimes makes it difficult to uniformly or efficiently remove elements other than silica at fewer times from the composite oxide particles having a high content of the elements other than silica.

Removal of the elements other than silica is preferably continues until the $MO_x/SiO_2$ in the obtained silica-based particles is in the range from 0.0001 to 0.2, and more preferably in the range from 0.0001 to 0.1.

Step (c)

An organic silicon compound like that used in the step (a) can be used as the organic silicon compound expressed by the chemical formula (1), and the organic silicon compound with n of 0 in the chemical formula (1) may be used as it is, but when n is in the range from 1 to 3, it is preferable to use a partially hydrolyzed product of the organic silicon compound like that employed in the step (a).

Because the silica-coating layer as described above is tight, the inside is preserved in a gas phase or in a liquid phase with a low refractive index, and when used for forming a coating layer, intrusion of a material with a high refractive index such as resin for painting into the inside is prevented, and a coating film with a low refractive index can be formed.

When the organic silicon compound with n of 1 to 3 is used for forming a silica-coating layer, the dispersibility in an organic solvent is high, and a dispersion liquid of silica-based particles with high affinity to resin can be obtained. Furthermore, the surface may be processed, for example, with a silane coupling agent, but because the dispersibility in an organic solvent and the affinity with resin are high, the processing may be omitted.

When an organic silicon compound containing fluorine is used for forming a silica-coating layer, a coating layer containing fluorine atoms is formed, so that the obtained particles have lower refractive index and the dispersibility in an organic solvent is high, and therefore it is possible to obtain a dispersion liquid of silica-based particles having high affinity with resin. As the organic silicon compound containing fluoride, there can be enumerated 3,3,3-trifluoropropyl trimethoxysilane, methyl-3,3,3-trifluoropropyl dimethoxysilane, heptadecafluorodecyl trichlorosilane, heptadecafluorodecyl trichlorosilane, heptadecafluorodecyl trimethoxysilane, trifluoropropyl trimethoxysilane, tridecafluorooctyl trimethoxysilane, and the like. Furthermore also the compounds expressed by the chemical formula (2) or the chemical formula (3) provide the same effect, and therefore the compounds may advantageously be used for the purpose.

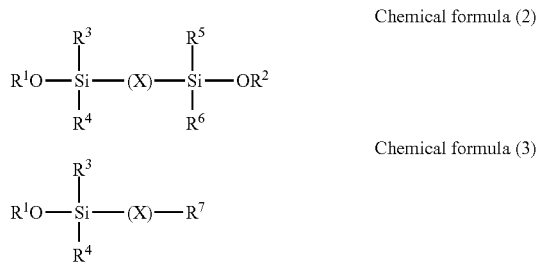

Chemical formula (2)

Chemical formula (3)

In chemical formulas (2) and (3), $R^1$ and $R^2$, and $R^1$ and $R^7$ may be identical to or different from each other respectively, and denote any of an alkyl group, a halogenated alkyl group, an aryl group, an alkyl aryl group, an aryl alkyl group, an alkenyl group, a hydrogen atom, or a halogen atom.

$R^3$ to $R^6$ may be identical to or different from each other, and denotes any of an alkoxy group, an alkyl group, a halogenated alkyl group, an aryl group, an alkyl aryl group, an aryl alkyl aryl group, an alkenyl group, a hydrogen atom, or a halogen atom.

X denotes —$C(C_aH_bF_c)$—, and a is a even integral number of 2 or more, and b and c are even integral numbers of 0 or more.

Methoxysilane expressed as $(CH_3O)_3SiC_2H_4C_6F_{12}C_2H_4Si(CH_3O)_3$ is, for instance, one of the compounds expressed by the chemical formula (2).

Step (d)

In the step (d), cleaning is performed according to the necessity, and then the dispersion liquid of silica-based particles is aged at a temperature in the range from the room temperature to 300° C.

The dispersion liquid with the elements having been removed can be cleaned by any cleaning method such as ultrafiltration or the like according to the necessity to remove a portion of the elements other than silicon dissolved in the liquid during cleaning. In this case, when alkali metal ions, alkali earth metal ions, and ammonium ions and the like contained in the dispersion liquid are partially removed first and then the dispersion liquid is subjected to ultrafiltration, it is possible to obtain a sol in which silica-based particles having high dispersion stability are dispersed.

Furthermore, a portion of the elements other than silicon dissolved in the dispersion liquid from which a portion of the elements has been partially removed, namely alkali metal ions, alkali earth metal ions, ammonium ions and the like can be removed also by contacting the dispersion liquid to cation exchange resin and/or anion exchange resin. When the dispersion liquid is warmed before cleaning, cleaning can be performed efficiently.

By subjecting the dispersion liquid to the cleaning step as described above, contents of alkali metal oxides and ammonia contained in the silica-based particles obtained through the hydrothermal processing described below can be reduced efficiently, and therefore such performances as the stability and adaptability for formation of a coating film of the paint for forming a coating film obtained by the silica-based particles as described below are improved, and the obtained coating film is excellent in the strength.

Then, the dispersion liquid is aged generally for about 1 to 24 hours at a temperature in the range from the room temperature to 300° C., preferably in the range from 50 to 250° C. When the dispersion liquid is aged, the silica-coating layer becomes more homogeneous and tight, and materials with a high refractive index can not intrude into the particles, so that a coating film with a low refractive index can be formed.

Step (e)

At the step (e), the dispersion liquid is subjected to the hydrothermal processing at a temperature in the range from 50-300° C. after cleaning the dispersion liquid, if necessary. A known cleaning method can be employed like in the step (d).

When the hydrothermal processing temperature is less than 50° C., contents of an alkali metal oxide and/or ammonia in the finally obtained silica-based particles or the silica-based particle dispersion liquid cannot be effectively reduced so that effects such improving the stability and the capability in forming a coating film becomes insufficient, and the strength of the obtained coating film is improved only insufficiently.

When the hydrothermal processing temperature exceeds 300° C., the stability of the paint for forming a coating film, a film-forming capacity, a film strength and the like are not enhanced, and, in some cases, silica-based particles are aggregated.

It is to be understood that, when the above-mentioned hydrothermal processing temperature is in the range form 150° C. to 300° C., the coating film obtained by using the silica-based particle is excellent enough in the water-resistance to obtain an effect of easily swabbing a water drop on the coating, hardly leaving a trace of water drop, for example, when the water drop is dried.

The step (e) can be repeated several times. The contents of the alkali metal oxide and/or the ammonia (including an ammonia ion) in the obtained silica-based particles can be reduced by repeating the step (e).

The average particle diameter of the silica-based particles obtained in this way is preferably in the range from 5 to 500 nm, and more preferably in the range from 10 to 400 nm. When the average particle diameter is less than 5 nm, it is hard to obtain sufficient cavities nor to provide a sufficient effect from reducing the refractive index. When the average particle diameter is over 500 nm, it is hard to obtain a stable dispersion liquid and irregularities might appear on the surface of the coating film containing the particles or the haze becomes more visible. It is to be understood that the average particle diameter of the silica-based particles according to the present invention can be obtained by the dynamic light scattering method.

The content of the alkali metal oxide as $M_2O$ (M: an alkali metal element) in the above-mentioned silica-based particles is preferably 5 ppm or less, more preferably 2 ppm or less. When the content of the above-mentioned alkali metal oxide is over 5 ppm, the stability of the paint for forming a coating film with silica-based particles blended therein is insufficient with the viscosity increased and the film forming capacity reduced so that the strength of the obtained coating film becomes insufficient or the film thickness becomes uneven.

The content of the ammonia (including an ammonium ion) as $NH_3$ in the above-mentioned silica-based particles is preferably 1500 ppm or less, and more preferably 1000 ppm or less. When the content of the above-mentioned ammonia is over 1500 ppm, like in the above-mentioned case of the alkali metal oxide, the stability of the paint for forming a coating film with silica-based particles blended therein is insufficient with the viscosity increased and the film forming capacity reduced so that the strength of the obtained film becomes insufficient or the coating thickness becomes uneven.

It is to be understood that in a method for producing the silica-based particles according to the present invention, an organic solvent dispersion sol can be obtained by substituting the obtained silica-based particle dispersion liquid with an organic solvent using an ultrafiltration membrane, a rotary evaporator or the like.

Also, in a method for producing the silica-based particles according to the present invention, the silica-based particle dispersion liquid can be washed, dried, and calcinated if necessary.

The silica-based particles obtained in this way has cavities inside thereof and a low refractive index. Therefore, a coating film formed by using the silica-based particles has a low refractive index and a film excellent in anti-reflection capacity is obtained.

The silica-based particle according to the present invention has cavities inside thereof. Therefore, the refractive index of the silica-based particle ranges from 1.15 to 1.38, while the refractive index of a usual silica is 1.45. It is to be understood that the cavities can be confirmed by observing a TEM (transmission electron microscope) photograph of the cross-section surface of the particle. FIGURE illustrates the TEM (transmission electron microscope) picture of the silica-based particles obtained in Embodiment 12.

[Paint for Forming a Coating Film]

The paint for forming a coating film according to the present invention is described next.

The paint for forming a coating film according to the present invention comprises the above-mentioned silica-based particles, a matrix for forming a coating film and an organic solvent blended, if necessary.

The matrix for forming a coating film means a component capable of forming a coating film on a surface of the substrate and can be selected and used from a resin or the like satisfying the conditions such as adhesiveness to a substrate, hardness, coating capability or the like. For instance, a polyester resin, an acrylic resin, an urethane resin, a polyvinyl chloride resin, an epoxy resin, a melamine resin, a fluorine resin, a silicone resin, a butyral resin, a phenol resin, a vinyl acetate resin, an ultraviolet curing resin, an electron beam curable resin, an emulsion resin, a water-soluble resin, a hydrophilic resin which has been conventionally used, a mixture of the resins and a resin such as a copolymer, variants thereof or the like, or a hydrolyzed organic silicon compounds such as the above-mentioned alkoxysilane or the like, and a partially hydrolyzed product thereof may be used.

When a resin for paint is used as a matrix, for example, the organic solvent dispersion sol obtained by substituting the dispersion media of the silica-based particle dispersion liquid with an organic solvent such as alcohol, preferably, the silica-based particles with a silica-coating layer formed by an organic silica compound containing an organic group is used, and, the particles are processed by a known coupling agent, if necessary, before the organic solvent dispersion liquid blended in the organic solvent and the resin for coating are diluted with a proper organic solvent to provide an coating liquid.

On the other hand, when a hydrolyzed organic silicon compound is used as a matrix, a partially hydrolyzed product of alkoxysilane is obtained by adding water, an acid or an alkali as a catalyst to the mixture solution of alkoxysilane and alcohol, and the above-mentioned sol is added thereto, and diluted with the organic solvent, if necessary, to obtain an coating liquid.

A weight ratio of the silica-based particle and the matrix in the coating liquid for forming a coating film is preferably in the range of the silica-based particle/matrix from 1/99 to 9/1. When the weight ratio exceeds 9/1, the coating liquid lacks in practicality as the strength of the coating film and the adhesiveness with the substrate. On the other hand, when the weight ratio is less than 1/99, addition of the silica-based particle has an insufficient effect on lowering the refractive index of the coating film, increasing the adhesiveness with the substrate, enhancing the strength of the coating film or the like.

[Substrate with a Coating Film]

In the substrate with a coating film according to the present invention, the coating film comprising the silica-based particles and the matrix for forming a coating film is formed on a surface of the substrate singly or together with another coating film.

The substrate is a substrate with a coating film formed on the surface of glass, polycarbonate, an acryl resin, a PET, a plastic film such as TAC or the like, a plastic coating, a plastic lens, a substrate with a plastic panel or the like, a cathode-ray tube, a fluorescent display, a LCD panel or the like, and the coating film is formed singly or in combination with a protective film, a hard coating film, a planarizing film, high refractive index film, an insulating film, a conductive resin film, a conductive metal particle film, a conductive metal oxide particle film and a primer film or the like used according to the necessity. It is to be understood that the coating film according to the present invention does not need to be formed on the outermost surface when the coating film is used in combination with another film.

This kind of film can be obtained by applying the above-mentioned paint for forming a coating film to the substrate by a known method such as the dipping method, the spray method, the spinner method, a roll coating method or the like, drying, and additionally hardening by heating, exposing the film to ultraviolet radiation or the like, if necessary.

The refractive index of the coating film formed on the surface of the above-mentioned substrate has a low refractive index from 1.15 to 1.42 though the refractive index of the coating film varies according to the blend ratio of the silica-based particles, the matrix component or the like and the refractive index of the matrix to be used. It is to be understood that the refractive index of the silica-based particles according to the present invention is in the range from 1.15 to 1.38. The reasons are that the silica-based particles according to the present invention has cavities inside thereof, and that the matrix-forming component such as a resin rests outside the particles and therefore the cavities inside the silica-based particles are maintained.

Furthermore, when the refractive index of the above-mentioned substrate with a coating film is 1.60 or less, the coating film including the silica-based particles according to the present invention is recommended to be formed after forming a coating film (hereinafter referred to as an intermediate film) with the refractive index of 1.60 or more on the surface of the substrate. When the refractive index of the intermediate film is 1.60 or more, the difference from the refractive index of the coating film including the above-mentioned silica-based particles according to the present invention is large enough to obtain a substrate with a coating film excellent in the anti-reflection capability. The refractive index of the intermediate coating film can be adjusted according to the refractive index of the metal oxide particles used for improving the refractive index of the intermediate film, the mixing ratio of the metal oxide particle, the resin or the like, and the refractive index of the resin to be used.

The coating liquid for forming a coating film of the intermediate film is a mixture of the metal oxide particle and the matrix for forming a coating film, and an organic solvent is mixed thereto, if necessary. The same matrix for forming a coating film as the one for forming a coating film including the above-mentioned silica-based particle according to the present invention may be used, and the substrate with a film excellent in adhesiveness between sheets can be obtained due to the use the same matrix for forming a coating film.

The present invention is described more specifically below with reference to the embodiments.

Embodiment 1

Preparation of Silica-Based Particles (P-1)

A mixture of 100 g of a silica sol with an average particle diameter 5 nm and the $SiO_2$ concentration of 20% by weight and 1900 g of deionized water is heated to 80° C. The pH of the reaction liquid is 10.5, and to the reaction liquid are simultaneously added 9000 g of a sodium silicate solution with 1.17% by weight as $SiO_2$ and 9000 g of a sodium aluminate solution with 0.83% by weight as $Al_2O_3$. The temperature of the reaction liquid is kept at 80° C. The pH of the reaction liquid goes up to 12.5 just after the addition and little changes after the materials are added. After termination of the addition, the reaction liquid is cooled to the room temperature and washed with an ultrafiltration membrane to prepare a dispersion liquid of $SiO_2.Al_2O_3$ primary particles with a solid phase concentration of 20% by weight.

1700 g of deionized water is added to 500 g of the primary particle dispersion, and the mixture is heated to and kept at 98° C., 50400 g of sodium sulfate with the concentration of 0.5% by weight is added thereto and 3,000 g of sodium silicate aqueous solution with the concentration of 1.17% by weight as $SiO_2$ and 9,000 g of sodium aluminate aqueous solution with the concentration of 0.5% by weight as $Al_2O_3$ are added thereto to obtain a dispersion liquid of composite oxide particles (1).

Next, 1,125 g of deionized water is added to the dispersion liquid of the composite oxide particle (1) with the solid phase concentration of 13% by weight after being cleaned with the ultrafiltration membrane, a concentrated hydrochloric acid with the concentration of 35.5% by weight is dropped to adjust the pH to 1.0 and dealuminate the dispersion liquid of the composite oxide particles (1). Adding 10 litters of a hydrochloric acid solution with pH 3 and 5 litters of deionized water, the aluminum salt dissolved in the liquid is separated and washed with the ultrafiltration membrane to obtain a dispersion liquid of silica-based particles (P-1-1) with the solid phase concentration of 20% by weight. Contents of $Na_2O$ and $NH_3$ in the aqueous dispersion liquid of the silica-based particles (P-1-1) are 1000 ppm and less than 10 ppm per silica-based particle respectively.

Ammonia water is added to the dispersion liquid of the silica-based particles (P-1-1) to adjust the pH of the aqueous dispersion to 10.5, and the mixture is matured for 11 hours at the temperature of 150° C., cooled to the room temperature, ion-exchanged for 3 hours using 400 g of cation-exchange resin (Mitsubishi Chemical Corporation; DIAION SK1B), ion-exchanged for 3 hours using 200 g of anion-exchange resin (Mitsubishi Chemical Corporation; DIAION SA20A) and ion-exchanged for 3 hours at the temperature of 80° C. using 200 g of cation-exchange resin (Mitsubishi Chemical Corporation; DIAION SK1B) and washed to obtain a dispersion liquid of silica-based particles (P-1-2) with the solid phase concentration of 20% by weight. At the time point, the contents of $Na_2O$ and $NH_3$ in the aqueous dispersion liquid of the silica-based particles (P-1-2) are 6 ppm and 1200 ppm per silica-based particle respectively.

After the dispersion liquid of the silica-based particles (P-1-2) is hydrothermally processed again for 11 hours at the temperature of 150° C., washed with the ultrafiltration membrane with 5 litters of deionized water to obtain a dispersion liquid of silica-based particles with the solid phase concentration of 20% by weight (P-1-3). At the point of time, contents of $Na_2O$ and $NH_3$ in the aqueous dispersion liquid of the silica-based particles (P-1-3) are 0.5 ppm and 600 ppm per silica-based particle respectively.

An alcoholic dispersion liquid of silica-based particles with the solid phase concentration of 20% by weight is prepared by substituting the solvent with ethanol with an ultrafiltration membrane.

The average particle diameter, $MO_x/SiO_2$ (molar ratio) and the refractive index of the silica-based particles (P-1) are shown in Table 1 together with the conditions for preparation. The average particle diameter is measured by the dynamic light scattering method and the refractive index is measured by the following method using Series A, AA manufactured by CARGILL as a standard refractive liquid.

Method of Measuring a Refractive Index of Particles (1) A dispersion liquid of silica-based particles is put into an evaporator and a dispersion medium is evaporated.

(2) The material obtained in the step (1) above is dried at 120° C. and powderized.

(3) A few drops of the standard refractive liquid whose refractive index is known are dropped on a glass plate and the above-mentioned powder is mixed thereto.

(4) The manipulation described in (3) above is carried out using a various kinds of standard refractive liquids and the refractive index of the standard refractive liquid when the mixture becomes transparent is determined as a refractive index of the particles.

Production of a Substrate with a Transparent Coating Film (A-1)

50 g of dispersion liquid obtained by diluting the alcoholic dispersion liquid of silica-based particles (P-1) to the solid phase concentration of 5% by weight with ethanol, 3 g of an acrylate resin (Hitaloid 1007 manufactured by Hitachi Chemical Co., Ltd) and 47 g of a 1/1 (weight ratio) mixed solution of isopropanol and n-butanol are mixed and sufficiently agitated to prepare a coating liquid.

The coating liquid is embrocated on a PET film using the bar coater method and dried for 1 minute at 80° C. to obtain a substrate with a transparent coating film (A-1) with the film thickness of the transparent coating film of 100 nm. A total transmittance, haze, a reflectance for a light with the wavelength of 550 nm, a refractive index of the film and pencil hardness of the substrate with the transparent coating film (A-1) are shown in Table 2. The total transmittance and the haze are measured by Haze Meter (manufactured by Suga Test Instruments Co., Ltd.) and the reflectance is measured by a spectrophotometer (Ubest-55 manufactured by Jasco Corporation) respectively. Also, the refractive index of the coating film is measured by an ellipsometer (EMS-1 manufactured by ULVAC Inc.). It is to be understood that the total transmittance of the unembrocated PET film is 90.7%, haze thereof is 2.0%, and the reflectance for a light with the wavelength of 550 nm is 7.0%. The pencil hardness is measured by a pencil hardness tester according to JIS K 5400. Namely, a pencil is set at an angle of 45 degrees with respect to a surface of the film, drawn at a constant velocity with a predetermined weight and observed if there is a blemish or not.

The adhesiveness is accessed by marking 11 parallel scratches on the surface of the substrate with the transparent coating film (A-1) vertically and horizontally at 1 mm intervals with a knife to obtain 100 squares, and then a cellophane tape is adhered to assess the adhesiveness classifying the number of squares remaining when the cellophane tape is peeled to the following 3 stages. The result is shown in Table 2.

The number of remaining squares over 90: ⊚
The number of remaining squares 85 to 89: ◯
The number of remaining squares less than 84: Δ

Production of a Substrate with a Transparent Coating Film (B-1)

A small amount of hydrochloric acid is added to a mixture of 20 g of ethyl silicate ($SiO_2$ concentration of 28% by weight), 45 g of ethanol and 5.33 g of deionized water to obtain a matrix dispersion liquid including a partially hydrolyzed product of ethyl silicate. 16.7 g of alcoholic dispersion liquid (the solid phase concentration of 18% by weight) of a silica-based particle (P-1) is mixed with the matrix dispersion liquid to prepare a coating liquid.

The coating liquid is embrocated on a surface of a transparent glass plate by the spinner method at a speed of 500 rpm for 10 seconds and is heated for 30 hours at 160° C. to obtain a substrate with a transparent coating film whose thickness is 200 nm (B-1). The total transmittance, haze, the reflectance of a light with a wavelength of 550 nm, the refractive index of the film and the pencil hardness of the substrate with the transparent coating film (B-1) are shown in Table 3. It is to be understood that the total transmittance of the unembrocated glass substrate is 92.0%, haze thereof is 0.1%, and the reflectance of the light with the wavelength of 550 nm is 4.5%.

Embodiment 2

Preparation of Silica-Based Particles (P-2)

Like in Embodiment 1, a mixture of 1500 g of a prepared aqueous dispersion with silica-based particles (P-1-1) whose solid phase concentration is 20% by weight, 500 g of deionized water, 1,750 g of ethanol and 626 g of 28% ammonia water is heated to 35° C., 104 g of ethyl silicate ($SiO_2$ concentration of 28% by weight) is added thereto to form a silicate film, and a dispersion liquid of silica-based particles (P-2-1) with the solid phase concentration of 20% by weight is obtained by adding 5 litters of deionized water and washing the mixture with a ultrafiltration membrane.

Next, a dispersion liquid with silica-based particles (P-2-1) is aged for 1 hour at 200° C., washed with an ultrafiltration membrane by adding 5 litters of deionized water to obtain a dispersion liquid of silica-based particles (P-2-2) with the solid phase concentration of 20% by weight. At the point of time, the contents of $Na_2O$ and $NH_3$ in the aqueous dispersion liquid of the silica-based particles (P-2-2) are 1 ppm and 2500 ppm per silica-based particle respectively.

Then, the dispersion liquid of silica-based particles (P-2-2) is hydrothermally processed for 11 hours at 150° C. and washed with the ultrafiltration membrane by adding 5 L of deionized water to obtain a dispersion liquid containing silica-based particles (P-2-3) with the solid phase concentration of 20% by weight. At the point of time, contents of $Na_2O$ and $NH_3$ in the dispersion liquid of the silica-based particles (P-2-3) are 0.5 ppm and 900 ppm per silica-based particle respectively.

Next, an alcoholic dispersion liquid of silica-based particles (P-2) with the solid phase concentration of 20% by weight is prepared by substituting the dispersion medium with ethanol by use of an ultrafiltration membrane.

Preparation of a Substrate with a Transparent Coating Film (A-2)

A substrate with a transparent coating film (A-2) is obtained like in Embodiment 1 except for the use of an alcoholic dispersion liquid of silica-based particles (P-2) instead of the alcoholic dispersion liquid of silica-based particles (P-1).

Preparation of a Substrate with a Transparent Coating Film (B-2)

A substrate with a transparent coating film (B-2) is obtained like in Embodiment 1 except for the use of an alcoholic dispersion liquid of silica-based particles (P-2) instead of an alcoholic dispersion liquid of silica-based particles (P-1).

Embodiment 3

Preparing a Silica-Based Particle (P-3)

An alcoholic dispersion liquid of silica-based particles (P-3) with the solid phase concentration of 20% by weight is prepared like in Embodiment 2 except for the use of 30,000 g of potassium nitrate with the concentration of 0.5% by weight instead of 50,400 g of sodium sulfate with the concentration of 0.5% by weight. It is to be understood that the contents of $Na_2O$ and $NH_3$ in the aqueous dispersion liquid of the silica-based particles (P-3-3) are 0.4 ppm and 800 ppm per silica-based particle respectively.

Preparation of a Substrate with a Transparent Coating Film (A-3)

A substrate with a transparent coating film (A-3) is obtained like in Embodiment 1 except for the use of an alcoholic dispersion liquid of silica-based particles (P-3) instead of an alcoholic dispersion liquid of silica-based particles (P-1).

Preparation of a Substrate with a Transparent Coating Film (B-3)

A substrate with a transparent coating film (B-3) is obtained like in Embodiment 1 except for the use of an alcoholic dispersion liquid of silica-based particles (P-3) instead of the alcoholic dispersion liquid of silica-based particles (P-1).

Embodiment 4

Preparation of Silica-Based Particles (P-4)

An alcoholic dispersion liquid of silica-based particles (P-4) with the solid phase concentration of 20% by weight is prepared like in Embodiment 2 except for the use of 53,200 g of ammonium sulfate with the concentration of 0.5% by weight instead of 50,400 g of sodium sulfate with the concentration of 0.5% by weight.

It is to be understood that the contents of $Na_2O$ and $NH_3$ in the aqueous dispersion liquid of the silica-based particles (P-4-3) are 0.5 ppm and 800 ppm per silica-based particle respectively.

Preparation of a Substrate with a Transparent Coating Film (A-4)

A substrate with a transparent coating film (A-4) is obtained like in Embodiment 1 except for the use of an alcoholic dispersion liquid of silica-based particles (P-4) instead of the alcoholic dispersion liquid of silica-based particles (P-1).

Preparation of a Substrate with a Transparent Coating Film (B-4)

A substrate with a transparent coating film (B-4) is obtained like in Embodiment 1 except for the use of an alcoholic dispersion liquid of silica-based particles (P-4) instead of an alcoholic dispersion liquid of silica-based particles (P-1).

Embodiment 5

Preparation of Silica-Based Particles (P-5)

An alcoholic dispersion liquid of silica-based particles (P-5) with the solid phase concentration of 20% by weight is prepared like in Embodiment 2 except for the use of 41,100 g of ammonium nitrate with the concentration of 0.5% by weight instead of 50,400 g of sodium sulfate with the concentration of 0.5% by weight.

It is to be understood that the contents of $Na_2O$ and $NH_3$ in the aqueous dispersion liquid of the silica-based particles (P-5-3) are 0.8 ppm and 700 ppm per silica-based particle respectively.

Preparation of a Substrate with a Transparent Coating Film (A-5)

A substrate with a transparent coating film (A-5) is obtained like in Embodiment 1 except for the use of an alcoholic dispersion liquid of silica-based particles (P-5) instead of an alcoholic dispersion liquid of silica-based particles (P-1).

Preparation of a Substrate with a Transparent Coating Film (B-5)

A substrate with a transparent coating film (B-5) is obtained like in Embodiment 1 except for the use of an alcoholic dispersion liquid of silica-based particles (P-5) instead of an alcoholic dispersion liquid of silica-based particles (P-1).

Embodiment 6

Preparation of Silica-Based Particles (P-6)

An alcoholic dispersion liquid of silica-based particles (P-6) with the solid phase concentration of 20% by weight is prepared like in Embodiment 2 except for the use of 46.4 g of vinylsilane (KBE-1003 manufactured by Shin-Etsu Chemical Co., Ltd. the concentration of 62.7% by weight) instead of 104 g of ethyl silicate ($SiO_2$ concentration of 28% by weight).

It is to be understood that the contents of $Na_2O$ and $NH_3$ content in the aqueous dispersion liquid of the silica-based particles (P-6-3) are 1 ppm and 900 ppm per silica-based particle respectively.

Preparation of a Substrate with a Transparent Coating Film (A-6)

A substrate with a transparent coating film (A-6) is obtained like in Embodiment 1 except for the use of an alcoholic dispersion liquid of silica-based particles (P-6) instead of an alcoholic dispersion liquid of silica-based particles (P-1).

Preparation of a Substrate with a Transparent Coating Film (B-6)

A substrate with a transparent coating film (B-6) is obtained like in Embodiment 1 except for the use of an alcoholic dispersion liquid of silica-based particles (P-6) instead of an alcoholic dispersion liquid of silica-based particles (P-1).

Embodiment 7

Preparation of Silica-Based Particles (P-7)

An alcoholic dispersion liquid of silica-based particles (P-7) with the solid phase concentration of 20% by weight is prepared like in Embodiment 2 except for the use of 50,400 g of sodium sulfate with the concentration of 0.2% by weight instead of 50,400 g of sodium sulfate with the concentration of 0.5% by weight, and the use of 34.3 g of epoxy silane (KMB-403 manufactured by Shin-Etsu Chemical Co., Ltd. the concentration of 84.9% by weight) instead of 104 g of ethyl silicate ($SiO_2$ concentration of 28% by weight).

It is to be understood that the contents of $Na_2O$ and $NH_3$ in the aqueous dispersion liquid of the silica-based particles (P-7-3) are 0.8 ppm and 800 ppm per silica-based particle respectively.

Preparation of a Substrate with a Transparent Coating Film (A-7)

A substrate with a transparent coating film (A-7) is obtained like in Embodiment 1 except for the use of an alcoholic dispersion liquid of silica-based particles (P-7) instead of an alcoholic dispersion liquid of silica-based particles (P-1).

Preparation of a Substrate with a Transparent Coating Film (B-7)

A substrate with a transparent coating film (B-7) is obtained like in Embodiment 1 except for the use of an alcoholic dispersion liquid of silica-based particles (P-7) instead of an alcoholic dispersion liquid of silica-based particles (P-1).

Embodiment 8

Preparation of Silica-Based Particles (P-8)

An alcoholic dispersion liquid of silica-based particles (P-8) with the solid phase concentration of 20% by weight is prepared like in Embodiment 2 except for the use of 34.75 g fluorinated alkyl silane (KMB-7083 manufactured by Shin-Etsu Chemical Co., Ltd. the concentration of 83.8% by weight) instead of 104 g of ethyl silicate ($SiO_2$ concentration of 28% by weight).

It is to be understood that the $Na_2O$ content and $NH_3$ content of the aqueous dispersion liquid of the silica-based particles (P-8-3) are 0.9 ppm and 800 ppm per a silica-based particle respectively.

Preparation of a Substrate with a Transparent Coating Film (A-8)

A substrate with a transparent coating film (A-8) is obtained like in Embodiment 1 except for the use of an alcoholic dispersion liquid of silica-based particles (P-8) instead of an alcoholic dispersion liquid of silica-based particles (P-1).

Preparation of a Substrate with a Transparent Coating Film (B-8)

A substrate with a transparent coating film (B-8) is obtained like in Embodiment 1 except for the use of an alcoholic dispersion liquid of silica-based particles (P-8) instead of an alcoholic dispersion liquid of silica-based particles (P-1).

Embodiment 9

Preparation of a Silica-Based Particle (P-9)

An alcoholic dispersion liquid of silica-based particles (P-9) with the solid phase concentration of 20% by weight is prepared like in the step (a) of Embodiment 2 except for simultaneously adding 9000 g of sodium silicate solution of 0.76% by weight as $SiO_2$ and 9000 g of sodium aluminate solution of 1.25% by weight as $Al_2O_3$ and using 50,400 g of sodium sulfate with the concentration of 2.0% by weight instead of 50,400 g of sodium sulfate with the concentration of 0.5% by weight.

It is to be understood that the contents of $Na_2O$ and $NH_3$ in the aqueous dispersion liquid of the silica-based particles (P-9-3) are 1 ppm and 800 ppm per silica-based particle respectively.

Preparation of a Substrate with a Transparent Coating Film (A-9)

A substrate with a transparent coating film (A-9) is obtained like in Embodiment 1 except for the use of an alcoholic dispersion liquid of silica-based particles (P-9) instead of an alcoholic dispersion liquid of silica-based particles (P-1).

Preparation of a Substrate with a Transparent Coating Film (B-9)

A substrate with a transparent coating film (B-9) is obtained like in Embodiment 1 except for the use of an alcoholic dispersion liquid of silica-based particles (P-9) instead of an alcoholic dispersion liquid of silica-based particles (P-1).

Embodiment 10

Preparation of Silica-Based Particles (P-10)

An alcoholic dispersion liquid of silica-based particles (P-10) with the solid phase concentration of 20% by weight is prepared like in Embodiment 1 except for not maturing nor hydrothermally processing the dispersion liquid of silica-based particles (P-1-1) with the solid phase concentration of 20% by weight.

Preparation of a Substrate with a Transparent Coating Film (A-10)

A substrate with a transparent coating film (A-10) is obtained like in Embodiment 1 except for the use of an alcoholic dispersion liquid of silica-based particles (P-10) instead of an alcoholic dispersion liquid of silica-based particles (P-1).

Preparation of a Substrate with a Transparent Coating Film (B-10)

A substrate with a transparent coating film (B-10) is obtained like in Embodiment 1 except for the use of an alcoholic dispersion liquid of silica-based particles (P-10) instead of an alcoholic dispersion liquid of silica-based particles (P-1).

Embodiment 11

Preparation of Silica-Based Particles (P-11)

An alcoholic dispersion liquid of silica-based particles (P-11) with the solid phase concentration of 20% by weight is prepared like in Embodiment 1 except for not hydrothermally processing the dispersion liquid of a silica-based particle (P-1-2) with the solid phase concentration of 20% by weight.

Preparation of a Substrate with a Transparent Coating Film (A-11)

A substrate with a transparent coating film (A-11) is obtained like in Embodiment 1 except for the use of an alcoholic dispersion liquid of silica-based particles (P-11) instead of an alcoholic dispersion liquid of silica-based particles (P-1).

Preparation of a Substrate with a Transparent Coating Film (B-11)

A substrate with a transparent coating film (B-11) is obtained like in Embodiment 1 except for the use of an alcoholic dispersion liquid of silica-based particles (P-11) instead of an alcoholic dispersion liquid of silica-based particles (P-1).

Embodiment 12

Preparation of Silica-Based Particles (P-12)

An alcoholic dispersion liquid of silica-based particles (P-12) with the solid phase concentration of 20% by weight is prepared like in Embodiment 2 except for not hydrothermally processing the dispersion liquid of a silica-based particle (P-2-2) with the solid phase concentration of 20% by weight.

Preparation of a Substrate with a Transparent Coating Film (A-12)

A substrate with a transparent coating film (A-12) is obtained like in Embodiment 1 except for the use of an alcoholic dispersion liquid of silica-based particles (P-12) instead of an alcoholic dispersion liquid of silica-based particles (P-1).

Preparation of a Substrate with a Transparent Coating Film (B-12)

A substrate with a transparent coating film (B-12) is obtained like in Embodiment 1 except for the use of an alcoholic dispersion liquid of silica-based particles (P-12) instead of an alcoholic dispersion liquid of silica-based particles (P-1).

Embodiment 13

Preparation of Silica-Based Particles (P-13)

An alcoholic dispersion liquid of silica-based particles (P-13) with the solid phase concentration of 20% by weight is prepared like in Embodiment 11 except for the use of 30,000 g of potassium nitrate with the concentration of 0.5% by weight instead of 50,400 g of sodium sulfate with the concentration of 0.5% by weight.

Preparation of a Substrate with a Transparent Coating Film (A-13)

A substrate with a transparent coating film (A-13) is obtained like in Embodiment 1 except for the use of an alcoholic dispersion liquid of silica-based particles (P-13) instead of an alcoholic dispersion liquid of silica-based particles (P-1).

Preparation of a Substrate with a Transparent Coating Film (B-13)

A substrate with a transparent coating film (B-13) is obtained like in Embodiment 1 except for the use of an alcoholic dispersion liquid of silica-based particles (P-13) instead of an alcoholic dispersion liquid of silica-based particles (P-1).

Embodiment 14

Preparing a Silica-Based Particle (P-14)

An alcoholic dispersion liquid of silica-based particles (P-14) with the solid phase concentration of 20% by weight is prepared like in Embodiment 11 except for the use of 53,200 g of ammonium sulfate with the concentration of 0.5% by weight instead of 50,400 g of sodium sulfate with the concentration of 0.5% by weight.

Preparation of a Substrate with a Transparent Coating Film (A-14)

A substrate with a transparent coating film (A-14) is obtained like in Embodiment 1 except for the use of an alcoholic dispersion liquid of silica-based particles (P-14) instead of an alcoholic dispersion liquid of silica-based particles (P-1).

Preparation of a Substrate with a Transparent Coating Film (B-14)

A substrate with a transparent coating film (B-14) is obtained like in Embodiment 1 except for the use of an alcoholic dispersion liquid of silica-based particles (P-14) instead of an alcoholic dispersion liquid of silica-based particles (P-1).

Embodiment 15

Preparation of Silica-Based Particles (P-15)

An alcoholic dispersion liquid of silica-based particles (P-15) with the solid phase concentration of 20% by weight is prepared like in Embodiment 11 except for the use of 41,100 g of ammonium nitrate with the concentration of 0.5% by weight instead of 50,400 g of sodium sulfate with the concentration of 0.5% by weight.

Preparation of a Substrate with a Transparent Coating Film (A-15)

A substrate with a transparent coating film (A-15) is obtained like in Embodiment 1 except for the use of an alcoholic dispersion liquid of silica-based particles (P-15) instead of an alcoholic dispersion liquid of silica-based particles (P-1).

Preparation of a Substrate with a Transparent Coating Film (B-15)

A substrate with a transparent coating film (B-15) is obtained like in Embodiment 1 except for the use of an alcoholic dispersion liquid of silica-based particles (P-15) instead of an alcoholic dispersion liquid of silica-based particles (P-1).

Embodiment 16

Preparation of Silica-Based Particles (P-16)

An alcoholic dispersion liquid of silica-based particles (P-16) with the solid phase concentration of 20% by weight is prepared like in Embodiment 11 except for the use of 46.4 g of vinylsilane (KBE-1003 manufactured by Shin-Etsu Chemical Co., Ltd. the concentration of 62.7% by weight) instead of 104 g of ethyl silicate ($SiO_2$ concentration of 28% by weight).

Preparation of a Substrate with a Transparent Coating Film (A-16)

A substrate with a transparent coating film (A-16) is obtained like in Embodiment 1 except for the use of an alcoholic dispersion liquid of silica-based particles (P-16) instead of an alcoholic dispersion liquid of silica-based particles (P-1).

Preparation of a Substrate with a Transparent Coating Film (B-16)

A substrate with a transparent coating film (B-16) is obtained like in Embodiment 1 except for the use of an alcoholic dispersion liquid of silica-based particles (P-16) instead of an alcoholic dispersion liquid of silica-based particles (P-1).

Embodiment 17

Preparation of Silica-Based Particles (P-17)

An alcoholic dispersion liquid of silica-based particles (P-17) with the solid phase concentration of 20% by weight is prepared like in Embodiment 11 except for the use of 34.3 g of epoxy silane (KMB-403 manufactured by Shin-Etsu Chemical Co., Ltd. the concentration of 84.9% by weight) instead of 104 g of ethyl silicate ($SiO_2$ concentration of 28% by weight).

Preparation of a Substrate with a Transparent Coating Film (A-17)

A substrate with a transparent coating film (A-17) is obtained like in Embodiment 1 except for the use of an alcoholic dispersion liquid of silica-based particles (P-17) instead of an alcoholic dispersion liquid of silica-based particles (P-1).

Preparation of a Substrate with a Transparent Coating Film (B-17)

A substrate with a transparent coating film (B-17) is obtained like in Embodiment 1 except for the use of an alcoholic dispersion liquid of silica-based particles (P-17) instead of an alcoholic dispersion liquid of silica-based particles (P-1).

Embodiment 18

Preparation of Silica-Based Particles (P-18)

An alcoholic dispersion liquid of silica-based particles (P-18) with the solid phase concentration of 20% by weight is prepared like in Embodiment 11 except for the use of 34.75 g of fluorinated alkylsilane (KMB-7083 manufactured by Shin-Etsu Chemical Co., Ltd. the concentration of 83.8% by weight) instead of 104 g of ethyl silicate ($SiO_2$ concentration of 28% by weight).

Preparation of a Substrate with a Transparent Coating Film (A-18)

A substrate with a transparent coating film (A-18) is obtained like in Embodiment 1 except for the use of an alcoholic dispersion liquid of silica-based particles (P-18) instead of an alcoholic dispersion liquid of silica-based particles (P-1).

Preparation of a Substrate with a Transparent Coating Film (B-18)

A substrate with a transparent coating film (B-18) is obtained like in Embodiment 1 except for the use of an alcoholic dispersion liquid of silica-based particles (P-18) instead of an alcoholic dispersion liquid of silica-based particles (P-1).

Embodiment 19

Preparation of Silica-Based Particles (P-19)

An alcoholic dispersion liquid of silica-based particles (P-19) with the solid phase concentration of 20% by weight is prepared like the step (a) of the embodiment 11 except for adding 9000 g of sodium silicate solution of 0.76% by weight as $SiO_2$ and 9000 g of sodium aluminate of 1.25% by weight as $Al_2O_3$.

Preparation of a Substrate with a Transparent Coating Film (A-19)

A substrate with a transparent coating film (A-19) is obtained like in Embodiment 1 except for the use of an alcoholic dispersion liquid of silica-based particles (P-19) instead of an alcoholic dispersion liquid of silica-based particles (P-1).

Preparation of a Substrate with a Transparent Coating Film (B-19)

A substrate with a transparent coating film (B-19) is obtained like in Embodiment 1 except for the use of an alcoholic dispersion liquid of silica-based particles (P-19) instead of an alcoholic dispersion liquid of silica-based particles (P-1).

Comparative Example 1

Silica-Based Particles (RP-1)

A dispersion medium of a silica sol (SI-45P, manufactured by Catalysts & Chemicals Ind. Co., Ltd., average particle diameter of 45 nm, $SiO_2$ concentration of 20% by weight) was used as silica-based particles is substituted with ethanol with the ultrafiltration membrane to provide an alcohol dispersion liquid of a silica-based particle (RP-1) with the solid phase concentration of 20% by weight). It is to be understood that the contents of $Na_2O$ and $NH_3$ in the silica sol are 20500 ppm and 100 ppm per silica particle respectively.

Preparation of a Substrate with a Transparent Coating Film (RA-1)

A substrate with a transparent coating film (RA-1) is obtained like in Embodiment 1 except for the use of an alcoholic dispersion liquid of silica-based particles (RP-1) instead of an alcoholic dispersion liquid of silica-based particles (P-1).

Preparation of a Substrate with a Transparent Coating Film (RB-1)

A substrate with a transparent coating film (RB-1) is obtained like in Embodiment 1 except for the use of an alcoholic dispersion liquid of silica-based particles (RP-1) instead of an alcoholic dispersion liquid of silica-based particles (P-1).

Comparative Example 2

Preparation of Silica-Based Particles (RP-2)

The dispersion liquid of $SiO_2 \cdot Al_2O_3$ primary particle with the solid phase concentration of 20% by weight is prepared like in Embodiment 1. 1,700 g of deionized water is added to 500 g of the first particle dispersion liquid, heated to 98° C., the temperature is kept, 3,000 g of sodium silicate solution with the concentration of 1.17% by weight as $SiO_2$ and 9,000 g of sodium aluminate solution with the concentration of 0.5% by weight as $Al_2O_3$ are added thereto to obtain a dispersion liquid of composite particles (RP-2-1).

Next, 500 g of the dispersion liquid of composite particles (RP-2-1) with the solid phase concentration of 13% by weight as a result of being washed with the ultrafiltration membrane is dealuminized by adding 1,125 g of deionized water, dropping a concentrated hydrochloric acid with the concentration of 35.5% by weight and adjusting the pH to 1.0. Adding 10 litters of hydrochloric acid solution with pH3 and 5 litters of deionized water, a solved aluminum salt is separated and washed with the ultrafiltration membrane to obtain a dispersion liquid of silica-based particles (RP-2) with the solid phase concentration of 20% by weight.

The average particle diameter of the silica-based particle (RP-2) is measured to be about 5 nm and the refractive index thereof is 1.43. Also, a photograph of the silica-based particle is taken with TEM (a transmission electron microscope) and observed to find that almost all the particles are ordinary particles and that there are few hollow particles.

Comparative Example 3

Preparation of Silica-Based Particles (RP-3)

An alcoholic dispersion liquid of silica-based particles (RP-3) with the solid phase concentration of 20% by weight is prepared like in the step (a) of Embodiment 10 except for the use of sodium silicate solution of 1.5% by weight as $SiO_2$ and sodium aluminate solution of 0.5% by weight as $Al_2O_3$. It is to be understood that the contents of $Na_2O$ and $NH_3$ in the aqueous dispersion liquid of the silica-based particle (RP-1-1) are 1200 ppm and less than 10 ppm per silica particle respectively.

Preparation of a Substrate with a Transparent Coating Film (RA-3)

A substrate with a transparent coating film (RA-3) is obtained like in Embodiment 1 except for the use of an alcoholic dispersion liquid of silica-based particles (RP-3) instead of an alcoholic dispersion liquid of silica-based particles (P-1).

Preparation of a Substrate with a Transparent Coating Film (RB-3)

A substrate with a transparent coating film (RB-3) is obtained like in Embodiment 1 except for the use of an alcoholic dispersion liquid of silica-based particles (RP-3) instead of an alcoholic dispersion liquid of silica-based particles (P-1).

TABLE 1

| | Molar ratio of primary particles | Electrolytic salt | | Silica film | | silica particles | | Minor-component | |
|---|---|---|---|---|---|---|---|---|---|
| Code | ($MO_x/SiO_2$) | kind | $M_E/M_S$ | kind | thickness (nm) | ratio ($MO_x/SiO_2$) | dia (nm) | ref. index | $Na_2O$ (ppm) | $NH_3$ (ppm) |
| P-1 | 0.35 | $Na_2SO_4$ | 1.09 | — | — | 0.0097 | 40 | 1.30 | 0.5 | 600 |
| P-2 | 0.35 | $Na_2SO_4$ | 1.09 | ET | 8 | 0.0019 | 46 | 1.28 | 0.5 | 900 |
| P-3 | 0.35 | $KNO_3$ | 0.91 | ET | 8 | 0.0019 | 46 | 1.27 | 0.4 | 800 |
| P-4 | 0.35 | $(NH_4)_2SO_4$ | 1.24 | ET | 8 | 0.0019 | 46 | 1.28 | 0.5 | 800 |
| P-5 | 0.35 | $NH_4NO_3$ | 1.58 | ET | 8 | 0.0017 | 47 | 1.30 | 0.8 | 700 |
| P-6 | 0.35 | $Na_2SO_4$ | 1.09 | V | 8 | 0.0017 | 47 | 1.27 | 1.0 | 900 |
| P-7 | 0.35 | $Na_2SO_4$ | 0.44 | EP | 8 | 0.0017 | 47 | 1.27 | 0.8 | 800 |
| P-8 | 0.35 | $Na_2SO_4$ | 1.09 | F | 8 | 0.0012 | 53 | 1.25 | 0.9 | 800 |
| P-9 | 0.75 | $Na_2SO_4$ | 5.39 | ET | 8 | 0.0023 | 60 | 1.30 | 1.0 | 800 |
| P-10 | 0.35 | $Na_2SO_4$ | 1.09 | — | — | 0.0097 | 40 | 1.30 | 1000 | 10> |
| P-11 | 0.35 | $Na_2SO_4$ | 1.09 | — | — | 0.0097 | 40 | 1.30 | 6 | 1200 |
| P-12 | 0.35 | $Na_2SO_4$ | 1.09 | ET | 8 | 0.0019 | 46 | 1.28 | | |
| P-13 | 0.35 | $KNO_3$ | 0.91 | ET | 8 | 0.0019 | 46 | 1.27 | | |
| P-14 | 0.35 | $(NH_4)_2SO_4$ | 1.24 | ET | 8 | 0.0019 | 46 | 1.28 | | |
| P-15 | 0.35 | $NH_4NO_3$ | 1.58 | ET | 8 | 0.0017 | 47 | 1.30 | | |
| P-16 | 0.35 | $Na_2SO_4$ | 1.09 | V | 8 | 0.0017 | 47 | 1.27 | | |
| P-17 | 0.35 | $Na_2SO_4$ | 1.09 | EP | 8 | 0.0017 | 47 | 1.28 | | |
| P-18 | 0.35 | $Na_2SO_4$ | 1.09 | F | 8 | 0.0012 | 53 | 1.25 | | |

TABLE 1-continued

| | Molar ratio of primary particles | Electrolytic salt | | Silica film | | silica particles | | Minor-component | |
|---|---|---|---|---|---|---|---|---|---|
| | | | | kind | thickness | ratio | dia | ref. index | Na$_2$O | NH$_3$ |
| Code | (MO$_x$/SiO$_2$) | kind | M$_E$/M$_S$ | | (nm) | (MO$_x$/SiO$_2$) | (nm) | | (ppm) | (ppm) |
| P-19 | 0.75 | Na$_2$SO$_4$ | 1.35 | ET | 8 | 0.0023 | 60 | 1.26 | — | — |
| RP-1 | 0.000 | — | — | — | — | 0.000 | 45 | 1.46 | 20500 | 100 |
| RP-2 | 0.35 | — | — | — | — | 0.0097 | 5 | 1.43 | — | — |
| RP-3 | 0.171 | Na$_2$SO$_4$ | 0.94 | — | — | 0.0005 | 30 | 1.42 | 1200 | 10> |

TABLE 2

Substrate with a transparent coating film (organic resin matrix)

| Code | Total Transmittance (%) | Haze (%) | Reflectance (%) | Refractive index of film | Adhesiveness | Pencil hardness |
|---|---|---|---|---|---|---|
| A-1 | 96.5 | 0.3 | 0.5 | 1.35 | ⊚ | 4H |
| A-2 | 95.5 | 0.3 | 0.4 | 1.33 | ⊚ | 3H |
| A-3 | 96.1 | 0.2 | 0.3 | 1.32 | ⊚ | 3H |
| A-4 | 96.2 | 0.2 | 0.4 | 1.33 | ⊚ | 3H |
| A-5 | 95.9 | 0.3 | 0.5 | 1.34 | ⊚ | 3H |
| A-6 | 96.8 | 0.1 | 0.3 | 1.32 | ⊚ | 3H |
| A-7 | 96.5 | 0.1 | 0.4 | 1.31 | ⊚ | 3H |
| A-8 | 96.7 | 0.1 | 0.2 | 1.31 | ⊚ | 3H |
| A-9 | 96.7 | 0.1 | 0.3 | 1.34 | ⊚ | 3H |
| A-10 | 96.5 | 0.3 | 0.5 | 1.35 | Δ | H |
| A-11 | 95.4 | 0.3 | 0.5 | 1.33 | Δ | H |
| A-12 | 95.5 | 0.3 | 0.4 | 1.33 | ○ | |
| A-13 | 96.1 | 0.2 | 0.3 | 1.32 | ○ | |
| A-14 | 96.2 | 0.2 | 0.4 | 1.33 | ○ | |
| A-15 | 95.9 | 0.3 | 0.5 | 1.34 | ○ | |
| A-16 | 96.8 | 0.1 | 0.3 | 1.32 | ⊚ | |
| A-17 | 96.5 | 0.1 | 0.4 | 1.33 | ⊚ | |
| A-18 | 96.7 | 0.1 | 0.2 | 1.31 | ⊚ | |
| A-19 | 96.7 | 0.1 | 0.3 | 1.32 | ⊚ | |
| RA-1 | 94.3 | 0.3 | 1.5 | 1.46 | ○ | H |
| RA-3 | 94.3 | 1.8 | 1.0 | 1.45 | ○ | H |

TABLE 3

Substrate with a transparent coating film (silicone resin matrix)

| Code | Total Transmittance (%) | Haze (%) | Reflectance (%) | Refractive index of film | Pencil hardness |
|---|---|---|---|---|---|
| B-1 | 96.1 | 0.3 | 0.5 | 1.35 | 8H |
| B-2 | 96.4 | 0.3 | 0.2 | 1.31 | 7H |
| B-3 | 96.2 | 0.2 | 0.3 | 1.33 | 7H |
| B-4 | 96.2 | 0.2 | 0.3 | 1.33 | 7H |
| B-5 | 96.5 | 0.1 | 0.4 | 1.34 | 7H |
| B-6 | 96.7 | 0.1 | 0.2 | 1.31 | 7H |
| B-7 | 96.0 | 0.1 | 0.3 | 1.31 | 7H |
| B-8 | 97.0 | 0.1 | 0.3 | 1.32 | 7H |
| B-9 | 96.5 | 0.1 | 0.1 | 1.34 | 7H |
| B-10 | 96.2 | 0.3 | 0.5 | 1.35 | H |
| B-11 | 96.1 | 0.3 | 0.5 | 1.35 | H |
| B-12 | 96.4 | 0.3 | 0.2 | 1.31 | |
| B-13 | 96.2 | 0.2 | 0.3 | 1.33 | |
| B-14 | 96.2 | 0.2 | 0.3 | 1.33 | |
| B-15 | 96.5 | 0.1 | 0.4 | 1.34 | |
| B-16 | 96.7 | 0.1 | 0.2 | 1.31 | |
| B-17 | 96.0 | 0.1 | 0.3 | 1.32 | |
| B-18 | 97.0 | 0.1 | 0.3 | 1.32 | |
| B-19 | 96.5 | 0.1 | 0.1 | 1.30 | |
| RB-1 | 94.0 | 0.2 | 1.3 | 1.43 | 5H |
| RB-3 | 94.8 | 0.8 | 1.2 | 1.41 | 5H |

What is claimed is:

1. A method of producing silica-based particles comprising:

a step (a-1) of simultaneously adding an aqueous solution of an alkali-soluble inorganic compound and at least one of an aqueous silicate solution and an acidic silicic acid solution to an alkali aqueous solution or an alkali aqueous solution with seed particles dispersed therein, thereby making a dispersion liquid containing composite oxide particles with a molar ratio of MO$_x$/SiO$_2$ in a range from 0.3 to 1.0, wherein the MO$_x$ denotes an inorganic oxide other than silica, and the MO$_x$ denotes a compound selected from the group consisting of Al$_2$O$_3$, B$_2$O$_3$, TiO$_2$, ZrO$_2$, SnO$_2$, Ce$_2$O$_3$, P$_2$O$_5$, Sb$_2$O$_3$, MoO$_3$, ZnO$_2$, WO$_3$, TiO$_2$—Al$_2$O$_3$ and TiO$_2$—ZrO$_2$;

a step (a-2) of building up the composite oxide particles so that an average particle diameter is in a range from 5 to 300 nm;

a step (a-3) of adding an electrolytic salt to the dispersion liquid obtained by the step (a-2) so that a molar ratio of M$_E$/SiO$_2$ is in a range of 0.1 to 10, and forming a protective film on each surface of the composite oxide particles so that a molar ratio of MO$_x$/SiO$_2$ of the protective film is lower than the molar ratio MO$_x$/SiO$_2$ of the composite oxide particles obtained by the step (a-1), wherein the electrolytic salt is selected from the group consisting of sodium chloride, potassium chloride, sodium nitrate, potassium nitrate, sodium sulfate, potassium sulfate, ammonium nitrate, ammonium sulfate, magnesium chloride, and magnesium nitrate, and the $M_E$ denotes a mole number of the electrolytic salt; and a step (b) of adding an acid to the dispersion liquid obtained by the step (a-3) so that element M of the $MO_x$ is removed from the composite oxide particles, thereby making a dispersion liquid of silica-based particles with internal cavities therein from the composite oxide particles in the dispersion liquid.

2. The method of producing silica-based particles according to claim 1 further comprising:
a step (d) of cleaning the silica-based particles dispersion liquid obtained by the step (b) and aging the dispersion liquid at a temperature in a range from a room temperature to 300° C.

3. The method of producing silica-based particles according to claim 2, further comprising:
a step (c) of adding an alkali aqueous solution and an organic silicon compound expressed by the following chemical formula (1) and/or a partially hydrolyzed product thereof in the dispersion liquid of silica-based particles obtained by the step (b) to form a silica coating layer on the particles, the step (c) being performed after the step (b):

$$R_nSiX_{(4-n)} \qquad (1)$$

wherein R denotes any of a not-substituted or substituted hydrocarbon group having 1 to 10 carbon atoms, an acryl group, an epoxy group, a methacryl group, an amino group, a $CF_2$ group; X denotes an alkoxy group having 1 to 4 carbon atoms, a silanole group, a halogen atom, or a hydrogen atom; and n denote an integer of 0 to 3.

4. The method of producing silica-based particles according to claim 2 further comprising;
a step (e) of cleaning the silica-based particles dispersion liquid obtained by the step (d) and hydrothermally processing the dispersion liquid at a temperature in a range from 50 to 300° C.

5. The method of producing silica-based particles according to claim 4, wherein the step (e) is repeated several times.

6. The method of producing silica-based particles according to claim 4, wherein a content of alkali metal oxide in the silica-based particles or the dispersion liquid of silica-based particles in the step (e) is 5 ppm or below as expressed as that of $M_2O$ (M denoting an alkali metal element) per silica-based particle.

7. The method of producing silica-based particles according to claim 4, wherein contents of ammonia and/or ammonium ions in the silica-based particles or the dispersion liquid of silica-based particles is 1500 ppm or below as expressed as that of $NH_3$ per silica-based particle.

8. The method of producing silica-based particles according to claim 1, wherein pH of the alkali aqueous solution or the alkali aqueous solution with seed particles dispersed therein is 10 or more.

9. The method of producing silica-based particles according to claim 1, wherein the inorganic oxide other than silica is alumina.

10. The method of producing silica-based particles according to claim 1, wherein the dispersion liquid of silica-based particles is cleaned, dried, and calcinated.

11. The method of producing silica-based particles according to claim 1, wherein an average diameter of the silica-based particles is in a range from 5 to 50 nm.

12. The method of producing silica-based particles according to claim 1, wherein the electrolytic salt is selected from the group consisting of potassium nitrate, sodium sulfate, ammonium nitrate, and ammonium sulfate.

13. The method of producing silica-based particles according to claim 1, wherein the molar ratio of $M_E/SiO_2$ is in a range of 0.2 to 8.

14. The method of producing silica-based particles according to claim 1, wherein alkali-soluble inorganic compound is selected from the group consisting of sodium aluminate, sodium tetraborate, zirconyl ammonium carbonate, potassium antimonate, potassium stannate, sodium aluminosilicate, sodium molybdate, cerium ammonium nitrate, and sodium phosphate.

15. A method of producing silica-based particles comprising:
a step (a-1) of simultaneously adding an aqueous solution of an alkali-soluble inorganic compound and at least one of an aqueous silicate solution and an acidic silicic acid solution to an alkali aqueous solution or an alkali aqueous solution with seed particles dispersed therein, thereby making a dispersion liquid containing composite oxide particles with a molar ratio of $MO_x/SiO_2$ in a range from 0.3 to 1.0,
wherein the $MO_x$ denotes an inorganic oxide other than silica, and
the $MO_x$ denotes a compound selected from the group consisting of $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $WO_3$, $TiO_2$—$Al_2O_3$ and $TiO_2$—$ZrO_2$;
a step (a-2) of building up the composite oxide particles so that an average particle diameter is in a range from 5 to 300 nm;
a step (a-3) of adding an electrolytic salt to the dispersion liquid obtained by the step (a-2) so that a molar ratio of $M_E/SiO_2$ is in a range of 0.1 to 10,
wherein the electrolytic salt is selected from the group consisting of sodium chloride, potassium chloride, sodium nitrate, potassium nitrate, sodium sulfate, potassium sulfate, ammonium nitrate, ammonium sulfate, magnesium chloride, and magnesium nitrate, and the $M_E$ denotes a mole number of the electrolytic salt;
a step (a-4) of further adding an aqueous solution of an alkali-soluble inorganic compound and at least one of an aqueous silicate solution and an acidic silicic acid solution to the dispersion liquid obtained by the step (a-3) to grow composite oxide particles, and forming a protective film on each surface of the composite oxide particles so that a molar ratio of $MO_x/SiO_2$ of the protective film is lower than the molar ratio of $MO_x/SiO_2$ of the composite oxide particles obtained by the step (a-1), and a molar ratio of $M_E/SiO_2$ of the dispersion liquid of the step (a-4) is in a range of 0.1 to 10; and
a step (b) of adding an acid to the dispersion liquid obtained by the step (a-4) so that element M of the $MO_x$ is removed from the composite oxide particles, thereby making a dispersion liquid of silica-based particles with internal cavities therein from the composite oxide particles in the dispersion liquid.

16. The method of producing silica-based particles according to claim 1, wherein a concentration of the dispersion liquid of composite oxide particles is in a range from 0.1 to 50% by weight.

* * * * *